United States Patent
Ueyanagi et al.

(10) Patent No.: US 6,275,453 B1
(45) Date of Patent: Aug. 14, 2001

(54) OPTICAL HEAD AND OPTICAL DISK APPARATUS

(75) Inventors: Kiichi Ueyanagi; Kazuo Baba, both of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/184,979

(22) Filed: Nov. 3, 1998

(30) Foreign Application Priority Data

Nov. 6, 1997 (JP) .................................................... 9-304567

(51) Int. Cl.$^7$ ........................................................ G11B 7/00
(52) U.S. Cl. .................................. 369/44.14; 369/112.23
(58) Field of Search ............................. 369/44.14, 44.15, 369/44.16, 44.23, 103, 112, 121, 44.11, 112.01, 112.23, 112.24, 112.25, 112.26, 112.28, 112.29

(56) References Cited

U.S. PATENT DOCUMENTS

| | | |
|---|---|---|
| 4,796,226 | 1/1989 | Valette . |
| 5,497,359 | 3/1996 | Mamin et al. . |
| 5,533,042 | 7/1996 | Fukunaga et al. . |
| 5,729,393 | 3/1998 | Lee et al. . |
| 5,793,407 | 8/1998 | Park et al. . |
| 5,812,518 | 9/1998 | Fukakusa . |
| 6,061,322 | * 5/2000 | Jain et al. ..................... 369/44.14 X |

FOREIGN PATENT DOCUMENTS

| | | |
|---|---|---|
| 0 281 756 A2 | 9/1988 | (EP) . |
| 61-005447 | 1/1986 | (JP) . |
| 62-262233 | 11/1987 | (JP) . |
| 3-102655 | 4/1991 | (JP) . |
| 3-228233 | 10/1991 | (JP) . |
| 4-291030 | 10/1992 | (JP) . |
| 5-073980 | 3/1993 | (JP) . |
| 5-159336 | 6/1993 | (JP) . |
| 5-249307 | 9/1993 | (JP) . |
| 5-314533 | 11/1993 | (JP) . |
| 6-068484 | 3/1994 | (JP) . |
| 7-182688 | 7/1995 | (JP) . |
| 8-180453 | 7/1996 | (JP) . |

OTHER PUBLICATIONS

Sumio Hosaka et al., "Nanometer–Sized Phase–Change Recording Using a Scanning Near–Field Optical Microscope with a Laser Diode," *Jpn. J. Appl. Phys.*, vol. 35 (1996) pp. 443–447.

*Nikkei Electronics*, Jun. 15, 1998, No. 718, pp. 45–50.

*G. Ohtsu Electronics*, May 1996, pp. 92–95.

Suzuki, Takao et al., "Solid Immersion Lens Near Field Optical Approach for High Density Optical Recording," Manuscript for Asia–Pacific Data Storage Conference, Jul. 1997.

Terris, B.D. et al., "Near–Field Optical Data Storage," Appl. Phys. Lett., vol. 68, Jan. 1996, pp. 141–143.

Takizawa, Teruyuki et al., "High Speed Access Mechanism for 90mm 1" Height Optical Disk Drive," Conference Digest of Joint International Symposium on Optical Memory and Optical Data Storage, Jul. 1993, pp. 93–96.

(List continued on next page.)

*Primary Examiner*—Paul W. Huber
(74) *Attorney, Agent, or Firm*—Oliff & Berridge, PLC

(57) ABSTRACT

A small-sized optical head and optical disk apparatus capable of high-density recording at a high data transfer rate. A collimated light beam is incident on a first surface of a transparent condensing medium. The light beam incident on the first surface is reflected by a reflective structure, such as a metallic film or a hologram, formed on the outside of a second surface of the transparent condensing medium. The reflected light forms a beam spot on a third surface of the transparent condensing medium. Light condensed at the beam spot is emitted as near field light, and propagates to a recording medium for optical recording or reproduction.

33 Claims, 13 Drawing Sheets

OTHER PUBLICATIONS

Nakatsuka, Shin'ichi et al., "Controlled Spot Size Laser Diode with Flared Stripe and Twin Stripe Modulator at Flare Base," Jpn. J. Appl. Phys., vol. 34, Oct. 1995, pp. 1278–1279.

Lee, Chul Woo et al., "Feasibility Study on Near Field Optical Memory Using a Catadioptric Optical System," Optical Data Storage Topical Meeting, 1998, pp. 137–139.

The Nikkei Electronics Journal, vol. 699, 1997, pp. 13–14.

Kubota, Hiroshi, "Optics," Bookstore Iwanami, pp. 282–285.

"Optical Disk Technique," Radio Technique Co., pp. 94–99.

* cited by examiner

OPTICAL HEAD AND OPTICAL DISK APPARATUS

BACKGROUND OF THE INVENTION

1. Field of Invention

The present invention relates to an optical head and an optical disk apparatus, and more particularly to an optical head and an optical disk apparatus, whose beam spot is rendered minute.

2. Description of Related Art

In optical disk apparatus, realization of both higher density and larger capacity of optical disks from compact disks (CD) to digital video disks (DVD) is proceeding, and optical disk apparatuses are increasingly requested for larger capacity in order to meet the tendency of computers toward higher performance and that of displays toward higher definition.

The recording density of an optical disk is basically limited by the size of a beam spot formed on a recording medium. When light is condensed by an objective lens, a diameter (beam spot size) $D_{1/2}$ at which the optical intensity of the beam spot becomes ½ is given by the following equation (1), and the track width becomes substantially equal to this size.

$$D_{1/2}=k\lambda/(n \cdot NA) \qquad (1)$$

where k: Proportionality constant (normally about 0.5) depending on the intensity distribution of the beam, λ: Wavelength n: Refractive index (normally air, nearly 1) of medium at the position of beam spot, NA: Numerical aperture of the objective lens.

Since the NA of objective lenses used with conventional optical disks is about 0.5, $D_{1/2}$ is nearly equal to the wavelength. Also, as can be seen from equation (1), the use of a shorter wavelength or objective lenses of larger NA is effective to obtain a minute beam spot, and development efforts have been made respectively. In DVDs, the wavelength was shortened to 0.65 μm, and the NA of the objective lens was raised from 0.45 in the case of CD to 0.6 thereby providing a density roughly four times higher than CD in DVD. As for the wavelength, a green or blue luminous has further been vigorously developed. On the other hand, as for NA, when it exceeds 0.6, the influence of signal intensity fluctuation due to tilt of the optical disk becomes significant. Thus, it is difficult to increase the NA higher than 0.6 in the conventional optical recording system which is performed using a plastic substrate. Therefore, current optical storage development is shifting toward condensing light on a recording layer formed on a plastic substrate without passing the light through the plastic substrate.

In the optical recording systems that directly condense light on a recording layer, the following two systems using near field optics have been recently proposed for radically reducing the beam spot size. These systems have been both obtained by applying the high-resolution techniques of microscopes to optical recording.

The first system employs near field optics for recording in which light is emitted from the tip end of an optical probe whose tip end has been polished to a small tapered shape (several tens of nanometers or less). This system has many problems such as difficult and unstable working of the probe, susceptibility of the probe to mechanical shocks, short life, low light utilization efficiency of 1/1000 or less, and requires many improvements to put it to practical use.

The second system places a hemispherical lens (Solid Immersion Lens (hereinafter, abbreviated to "SIL")) consisting of a transparent medium having a high refractive index near the focus of an objective lens to thereby form a minute beam spot at the central portion of the bottom of the SIL for performing optical recording, and can be considered to be a technique having comparatively higher feasibility than the first system. Since the wavelength of light becomes shorter in inverse proportion to the refractive index of the SIL within it, the beam spot also becomes smaller in proportion thereto. The majority of light condensed at this beam spot is totally reflected toward the hemispherical surface of the SIL, and some portion thereof is emitted in the neighborhood of the beam spot outside of the SIL as near field light. If a recording medium having nearly the same refractive index as the SIL is arranged in the neighborhood (at a sufficiently smaller distance than the wavelength of light), the near field light enters this medium and propagates within the medium. By using this light to record on the medium, it becomes possible to perform high-density recording. Since, however, an aberration of the objective lens remains present, it is necessary to maintain the aberration of the objective lens sufficiently low. The light condensing system using this SIL has two types to be described below.

FIG. 13 shows an optical head of the first type. This optical head 50 comprises an objective lens 52 for condensing a collimated beam 51, and a hemispherical SIL 54 arranged so that a bottom face 54a thereof intersects convergent light 53 from the objective lens 52. When the collimated beam 51 is incident on the objective lens 52, the collimated beam 51 is condensed by the objective lens 52, the convergent light 53 from the objective lens 52 is incident on the hemispherical surface 54b of the SIL 54, and is condensed at the center of the bottom face 54a of the SIL 54 to form a beam spot 55. The diameter of the beam spot 55 at the optical head 50 is reduced in inverse proportion to the refractive index of the SIL 54. When the recording medium 56 is brought close to the beam spot 55, the near field light in the neighborhood of the beam spot 55 is incident on the recording medium 56 as propagation light.

FIG. 14 shows an optical head of the second type. This optical head 50 comprises an objective lens 52 for condensing a collimated beam 51, and a bottomed SIL 54 arranged so that the bottom face 54a thereof intersects convergent light 53 from the objective lens 52. The SIL 54 is arranged so as to refract the convergent light 53 from the objective lens 52 and further condense it. The SIL 54 is constructed such that the collimated beam 51 is condensed in a distance of r/n (r is radius of SIL) from the center 54c of the hemispherical surface 54b (called "Super SIL Structure"), whereby it is possible to have small spherical aberration due to the SIL 54, to raise the numerical aperture within the SIL 54 to n times that of the objective lens 52 shown in FIG. 13, and further to make the beam spot 55 minute. That is, the beam spot can be rendered minute as shown by the following equation (2):

$$D_{1/2}=k\lambda/(n \cdot NAi)=\lambda/(n^2 \cdot NAo) \qquad (2)$$

where NAi: Numerical aperture within SIL 54

NAo: NA of incident light on SIL 54

However, NA of the incident light on this Super SIL 54, that is, the maximum value θmax of the incident angle θ, is inversely related to the refractive index n of the SIL 54, and the two cannot be made independently large.

FIG. 15 shows the relationship between the refractive index n of Super SIL 54 and NAo, obtained by Suzuki in #0C-1 of Asia-Pacific Data Storage Conference (Taiwan, '97, 7) (hereinafter, referred to as "First conventional example"). As can be seen from FIG. 15, when the refractive index n of the SIL is continuously raised, the maximum value NAomax which the NAo of the incident light can take gradually becomes smaller. This is because when the NAo increase s over the maximum value NAomax and the incident angle becomes larger, the beam spot 55 at the position of the recording medium 56 becomes wider because the light does not pass through the SIL 54, but becomes directly incident on the recording medium 56. When, for example, the refractive index n=2, NAomax is 0.44, and the product n·NAomax is within a range of 0.8 to 0.9. This is the theoretical limit, and in reality is a smaller value (0.7 to 0.8).

Concerning the condensing experiment using the Super SIL, B. D. Terris et al reported in Appl. Phys. Lett. Vol. 68 ('96), P. 141 (hereinafter, referred to as "Second conventional example"). According to this report, a Super SIL having a refractive index n=1.83 is placed between an objective lens and recording medium, and a laser beam with a wavelength of 0.83 $\mu$m is condensed to thereby obtain a beam spot size of 0.317 $\mu$m. In other words, condensing equivalent to $D_{1/2}=\lambda/2.3$ is accomplished, and in this case, NA is 0.4, and n·NAmax is about 0.73. Also, the possibility of recording density ($3.8 \times 10^8$ bits/cm$^2$) several times the conventional density has been verified using this system.

FIG. 16 shows an optical disk apparatus (hereinafter, referred to as "Third conventional example") described in the specification of U.S. Pat. No. 5,497,359. This optical disk apparatus 500 comprises: an optical disk 501 obtained by forming a recording layer 501b on a plastic substrate 501a; a motor 504 provided on a base 502, for rotationally driving the optical disk 501 through a shaft 503; a flying slider 505 consisting of a transparent medium, for levitate-traveling on a recording layer 501b of the optical disk 501; a hemispherical SIL 54 mounted to the flying slider 505; a detection optical system unit 510 for generating signals for automatic focusing control and tracking control, or data signals from light reflected by an optical system for shaping and condensing a beam from a semiconductor laser, and the optical disk 501; an arm 506A for supporting the detection optical system unit 510; an arm 506B mounted to the arm 506A, for supporting the flying slider 505; and a voice coil motor (VCM) 507 provided on the base 502, for driving the arm 506A to cause the SIL 54 and the detection optical system unit 510 to access and track at the same time.

FIG. 17 shows the detail of the SIL 54 and the flying slider 505 of the third conventional example. The flying slider 505 is formed of a transparent medium having nearly the same refractive index as the SIL 54. The flying slider 505 is fixed to the hemispherical SIL 54, and a laser beam is condensed on the lower surface of the flying slider 505 to form a beam spot 55, whereby the Super SIL is constituted of the flying slider 505 and the SIL 54.

FIG. 18 shows the detail of a detection optical system unit 510 according to the third conventional example. In this detection optical system unit 510, the conventionally most general optical system is adopted, and this system is not improved so as to particularly conform to the SIL 54. More specifically, the detection optical system unit 510 comprises: a semiconductor laser 511 for emitting a laser beam 511a; a collimator lens 512 for collimating optical-power output 511a from the semiconductor laser 511 into a collimated beam 511b; a beam splitter 513 for splitting the optical-power output 511b from the semiconductor laser 511 and light reflected by an optical disk 501; a mirror 514; an objective lens 516A that is driven by an actuator 515, and condenses a collimated beam 511c from the semiconductor laser 511 on the optical disk 501; a photodetector 517 for detecting the light reflected by the optical disk 501, split by the beam splitter 513, and focused by a lens 516B; and an amplifier 518 for amplifying data signals (DAT) or control signals (FES, TES) that are output from the photodetector 517. For the SIL 54, a lens having a diameter of 2 mm is used, but in this case, the beam size at the position of the objective lens 516A is about 4 mm. Therefore, each optical system components 512, 513, 514, 516A and 516B in the detection optical system unit 510 require an effective aperture of 4 mm, nearly the same as the beam size, or larger.

Also, the optical disk apparatus 500 performs tracking control by means of one-stage control using a VCM 507 alone, and automatic focusing control for driving the objective lens 516A by an actuator 515. Since the depth of focus decreases inversely with the square of NA or the cube of n, the depth of focus in the case of condensing using the SIL 54 is as small as 0.2 $\mu$m or less. On the other hand, since there is a convergent beam between the objective lens 516A and the SIL 54, the depth of focus expands and contracts due to temperature fluctuations that cause focal displacement. Further, since temperature causes the laser wavelength to fluctuate, focal displacement additionally occurs due to chromatic aberration of the objective lens 516A. For this reason, highly precise automatic focus control is necessary to reduce the above-described focal displacement.

In an optical disk apparatus using an SIL that is levitated in proximity and travels on the recording medium, the optical head is suitable for applications in which the optical disk is used as a fixed and non-replaceable one, which is similar to a conventional magnetic hard disk. For this reason, it becomes indispensable to have high volumetric recording density when disks are stacked to be multi-head and multi-disk as well as a large recording capacity and high data transfer rate. In the case of the latest hard disk, since the disk interval is 3 mm or less, it is necessary to reduce the height of the optical head to that of the head (about 2 mm or smaller) of the hard disk.

FIG. 19 shows an optical head (hereinafter, referred to "Fourth conventional example") described in the specification of U.S. Pat. No. 5,497,359, developed to cope with such a need for miniaturization of the optical head. This optical head 50 is obtained by making an SIL 54, an objective lens 516A, a semiconductor laser and a detection optical system integral with one another on a flying slider 505. In FIG. 19, the semiconductor laser and the detection optical system are collectively shown as a single block 520, which is mounted to the flying slider 505 by a mounting member 521. Since the distance between the objective lens 516A and the block 520 is made shorter to thereby reduce the influence of change in temperature, there is no need for any automatic focusing control mechanism.

On the other hand, a conventional optical head whose weight has been reduced is shown in "Digest of Optical Data Storage ('93) P. 93" (hereinafter, referred to as "Fifth conventional example"). This optical head adopts a separation-type optical system in which the semiconductor laser and the detection unit are separated from the objective lens unit and fixed, and in which only the objective lens portion is caused to travel by a VCM. Tracking is performed by means of two-stage control in which the VCM is used for tracking in a low frequency area, while a galvano-mirror is used for tracking in a high frequency area. Thus, it is possible to reduce the weight of the movable portion including the objective lens to 7 g including the VCM. Also, it is possible to enlarge the frequency band up to about 30 kHz (gain of about 80 dB) by means of tracking using two-stage control.

FIG. 20 shows a conventional optical disk apparatus (hereinafter, referred to as "Sixth conventional example") described in the literature "The Nikkei Electronics Journal (No. 699, P. 13, '97.9.22)". This optical disk apparatus 500 has a separation optical system using a galvano-mirror for tracking, and comprises: a flying slider 505 for levitate-traveling on an optical disk 501; an SIL (not shown), an objective lens 530 and a folding mirror 531, which are mounted on the flying slider 505; an arm 532 for supporting the flying slider 505; a VCM 533 for driving the arm 532; a fixed optical system 534; and a mirror 535 for directing light from the fixed optical system 534 to the objective lens 530. The adoption of the separation optical system makes it possible to reduce the weight of the movable portion and to enlarge the frequency band for tracking as in the case of the fifth conventional example.

According to the first and second conventional examples, however, there is a problem that since the refractive index n of the SIL is reciprocally related to the maximum NAmax, the theoretical limits of the product n·NAmax are 0.8 to 0.9, so that the beam spot size is large and higher density cannot be achieved.

Also, in the optical disk apparatus 500 of the third conventional example, since the SIL 54 uses a lens with a diameter of 2 mm, a beam size of about 4 mm is required. Further, since the objective lens 516A must have a low chromatic aberration, the lens size (diameter or height) is large and makes the optical system large. Also, since a convergent beam is used for the beam incident on the SIL 54, an automatic focusing control mechanism is required because the convergent point varies depending on temperature fluctuations. Accordingly, the weight of the optical head is as heavy as 10 g or more, the height is as high as about 10 mm, and the intervals at which the optical disks 501 can be stacked are large, and therefore, leads to a problem that the volumetric capacity cannot be made small enough as that of the magnetic hard.

More specifically, it is possible to reduce the size of the entire optical system by making the diameter of the SIL 54 smaller, but the thickness of the flying slider 505 must be made thinner at the same time, and therefore, there is a limit to how small the system can be made. Namely, the thickness of the flying slider 505 becomes substantially equal to a distance r/n between the center and the condensing point, and if a medium having a refractive index of 2 is used, when a radius of the SIL 54 is 0.5 mm, the thickness of the flying slider becomes 250 $\mu$m, which is a minimum thickness to maintain mechanical strength.

In addition, when the weight of the optical head exceeds 10 g, there is a problem that high-speed tracking cannot be performed, nor can the data transfer rate be raised.

In the optical head 50 of the fourth conventional example, since it is actually difficult to miniaturize the optical head 50 and an automatic focusing control mechanism is required, there is a problem that the height of the optical head 50 increases, and it is difficult to make the device small as in the case of the third conventional example.

Also, although it is considered that no automatic focusing control is required, the optical system is susceptible to expansion and contraction of the optical system supporting member due to temperature fluctuations. In addition, it is also necessary to correct focal displacement due to fluctuations of the laser wavelength, making it difficult to eliminate the automatic focusing control mechanism.

The optical head in the fifth conventional example has a problem that high data transfer rate cannot be attained because the galvano-mirror has limits in the high frequency area.

More specifically, the track width becomes narrower as the beam spot is made smaller, and accordingly higher-speed and higher performance tracking control is required. The track width has a size equal to nearly 70% of an ordinary beam spot size $D_{1/2}$ as seen in a DVD. Accordingly, when the beam spot size $D_{1/2}$ is 0.31 $\mu$m, the track width is 0.2 $\mu$m, and when a blue laser (410 nm) is used, the track width is 0.1 $\mu$m or smaller. On the other hand, tracking must normally be performed at a tolerance of about one tenth of the track width, in other words, tracking with precision of±0.01 $\mu$m is required. Also, since tracks have been formed by stamping in advance in the optical disk, a decentered track with±several tens of microns occurs during the process. In order to track this track at a tolerance of±0.01 $\mu$m, a tracking error of±0.01 $\mu$m is detected to follow up with±several tens microns, and the control system requires a gain of more than 80 dB. Also, since the tracking control system is a secondary system and the band expands at −40dB/decade, the rotary speed is set to 3,600 rpm, and, a frequency band of about 200 kHz is required to perform tracking of 0.01 $\mu$m. More specifically, the band is for 30 kHz even when the galvano-mirror is used as discussed above, and it is difficult to perform tracking using one-stage control. It is necessary to reduce the rotary speed by one or more orders of magnitude, or to use a driving mechanism having lighter weight and higher performance than the galvano-mirror. A higher data transfer rate as well as higher density is naturally requested, but decreasing the rotary speed means a decrease in the data transfer rate in proportion thereto, which is a problem.

Also, in an optical disk apparatus 500 of the sixth conventional example, since the beam size has been set to 4 to 5 mm in order to reduce beam positional aberrations resulting from the movement of the optical head, the height of the optical head is nearly 10 mm. Thus, the intervals at which the optical disks 501 are stacked must be relatively large, and it is difficult to make the apparatus small in size. Also, although the wavelength is 680 nm, about 20% shorter than in the above-described example, the track pitch is set to 0.34 $\mu$m, which is designed to be larger than the theoretical value 0.2 $\mu$m of the spot size in this system, and the advantage of the SIL is not fully utilized.

The respective problems described above result from the fact that the SIL alone is not capable of condensing sufficiently, but two-stage condensing by a combination with an objective lens is required, and are essential problems of the optical head using the SIL.

Therefore, it is an object of the present invention to provide a small-sized optical head and optical disk apparatus capable of high-density recording with an improved data transfer rate.

SUMMARY OF THE INVENTION

The present invention provides an optical head comprising a laser beam emitter for emitting a laser beam and a transparent condensing medium. The transparent condensing medium includes a reflective structure that reflects and condenses a light beam to form a spot that is used for optical recording and/or reproduction.

In one aspect of the invention, the transparent condensing medium has a first surface on which the laser beam from the laser beam emitter is incident, a second surface, on the outside of which a reflective structure is formed, which reflects the laser beam incident on the first surface by the reflective film, and a third surface on which the laser beam reflected by the second surface is condensed to form a beam spot.

The present invention also provides an optical disk apparatus having a rotating optical disk and an optical head for forming a beam spot on the optical disk by condensing a laser beam to record or reproduce information. The optical head comprises a laser beam emitter for emitting the laser beam and a transparent condensing medium having a first surface on which the laser beam from the laser beam emitter is incident, a second surface, on the outside of which a reflective film is formed, which reflects the laser beam incident on the first surface, and a third surface on which the laser beam is condensed to form the beam spot.

The present invention also provides an optical disk apparatus having a plurality of rotating optical disks, coaxially arranged and spaced apart at a predetermined interval, and a plurality of optical heads that form a beam spot on the plurality of optical disks to record or reproduce information. The optical heads comprise a laser beam emitter for emitting a laser beam, and a transparent condensing medium having a first surface on which the laser beam from the laser beam emitter is incident, a second surface, on the outside of which a reflective film is formed, that reflects the laser beam incident on the first surface, and a third surface on which the laser beam reflected by the second surface is condensed to form the beam spot.

The present invention also provides an optical disk apparatus having a rotating optical disk, and an optical head that forms a beam spot on the optical disk to record or reproduce information. The apparatus includes an optical head driver that moves the optical head in predetermined tracking directions, a semiconductor laser that emits a laser beam, a piezoelectric element that moves the semiconductor laser to displace a position at which the beam spot is formed in the predetermined tracking directions, and a driver that controls the optical head driver on the basis of an error signal in a low frequency area and the piezoelectric element on the basis of an error signal in a high frequency area.

The present invention also provides an optical disk apparatus that forms a beam spot on an optical disk to record or reproduce information. The optical disk apparatus includes an irradiator that emits a collimated laser beam, and a reflector that reflects the laser beam to form the beam spot on the optical disk.

DETAILED DESCRIPTION OF PREFERRED EMBODIMENTS

Figure 1:
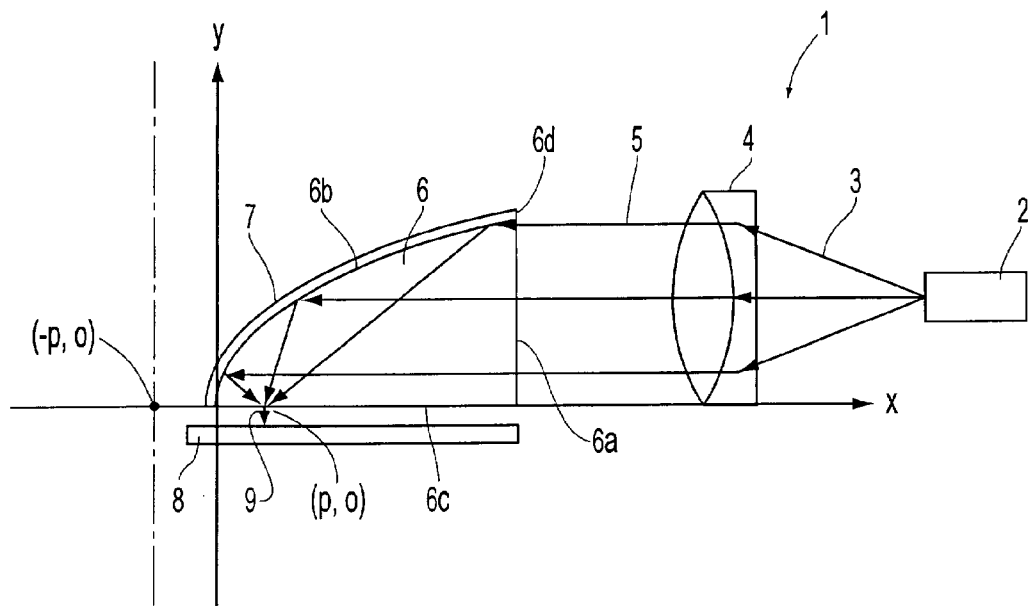
FIG. 1 is a view showing an optical head according to a first embodiment of the present invention.

FIG. 1 shows an optical head according to a first embodiment of the present invention. The optical head 1 comprises a semiconductor laser 2 for emitting a laser beam 3, a collimator lens 4 for shaping optical-power output 3 from the semiconductor laser 2 into a collimated beam 5, a transparent condensing medium 6 for condensing the collimated beam 5, a reflective film 7 formed on a second surface 6b of the transparent condensing medium 6, and a recording medium 8 arranged in the vicinity of a third surface 6c of the transparent condensing medium 6.

The transparent condensing medium 6 comprises a first surface 6a on which the collimated beam 5 is incident, a second surface 6b for reflecting the laser beam 5 incident on the first surface 6a, and a third surface 6c on which the laser beam reflected by the second surface 6b is condensed. The reflective film 7 formed on the second surface 6b reflects the laser beam 5 incident on the first surface 6a to form a beam spot 9 on the third surface 6c.

The second surface 6b defines a part of a paraboloid to make NA within the transparent condensing medium 6 large and to form a minute beam spot 9 on the third surface 6c. Taking the principal axis of the cross-section (6b) of the paraboloid as the x-axis, the vertical axis as the y-axis, and assuming the focal position to be (p, 0), the cross-section (6b) is represented by the following equation:

$$y^2 = 4px \qquad (3)$$

Also, when light is condensed within the transparent condensing medium 6 using a paraboloid, it is possible in principle to perform stigmatic condensing (Optics: Hiroshi Kubota, Bookstore Iwanami, P. 283), and to condense light on a minute spot 9 using a single condensing surface. In this case, the beam spot size $D_{1/2}$ is given by the following equation (4) as in the case of the SIL:

$$D_{1/2} = k\lambda/(n \cdot (NAi)) \qquad (4)$$

where NAi: Numerical aperture within the transparent condensing medium 6.

Next, the operation of the optical head 1 will be described. When the laser beam 3 is emitted from the semiconductor laser 2, the laser beam 3 is shaped into a collimated beam 5 by the collimator lens 4, and is incident on the first surface 6a of the transparent condensing medium 6. The laser beam 5 incident on the first surface 6a is reflected by the reflective film 7 formed on the outside of the second surface 6b to converge on the third surface 6c and form a beam spot 9 on the third surface 6c. The beam converged on the beam spot 9 is emitted as near field light, and propagates to the recording medium 8 for optical recording or optical reproduction. Incidentally, a spot converged by the second surface is formed so that the third surface is located within the depth of focus.

The optical head constructed as described above has the following effects:

(a) Assuming the focal position p of the paraboloid to be p=0.125 mm, and an upper end 6d of the paraboloid to be (x, y)=(2 mm, 1 mm), 60 degrees or more is obtained for the convergent angle from the upper end 6d, and the NA of the third surface 6c becomes 0.98, which is 1.6 or more times larger than NA=0.6 in the conventional DVD.

(b) Since a high NA can be obtained, it is possible to render the beam spot 9 minute.

(c) No chromatic aberration occurs because of reflection type condensing.

(d) The optical system of this embodiment is a so-called infinite system, that is, light rays in the laser beam 5 between the collimator lens 4 and the transparent condensing medium 6 are parallel, and therefore, the focal displacement due to temperature fluctuation is small.

(e) Since the laser beam 5 is incident on the first surface of the transparent condensing medium 6 in a direction substantially parallel to the optical disk surface, the optical system can be arranged along the recording medium 8 and it is possible to set the height of the optical head 1 low. Thus, when a plurality of optical disks are stacked, the resulting multi-disk system can be made compact.

Incidentally, for the reflective layer 7, a reflective hologram such as a volume hologram, an uneven binary hologram or a reflective material, such as aluminum, may be used.

Figure 2:
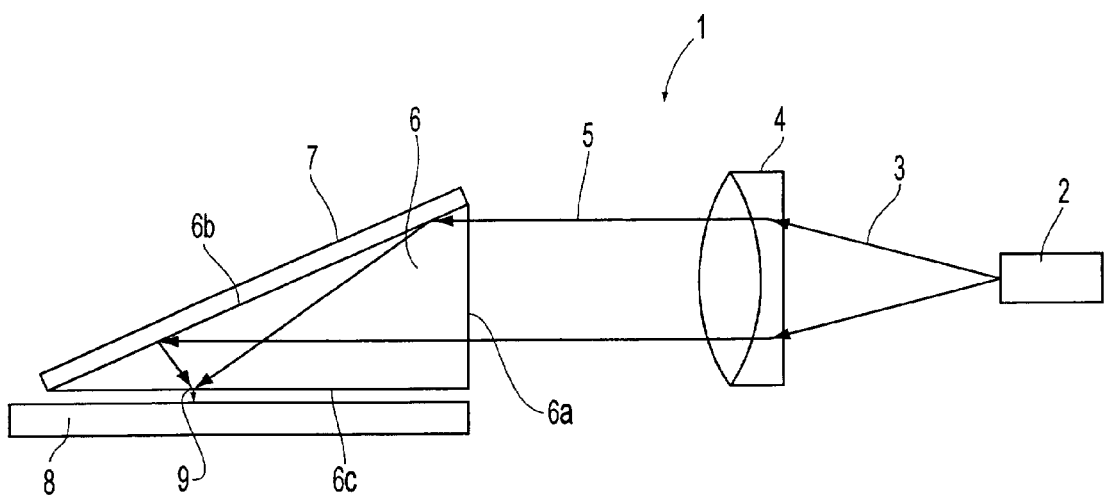
FIG. 2 is a view showing an optical head according to a second embodiment of the present invention.

FIG. 2 shows an optical head according to a second embodiment of the present invention. This optical head I is obtained by making the second surface 6b of a transparent condensing medium 6 planar, and using a reflective hologram, such as a volume hologram or a binary hologram for the reflective layer 7. In other respects, the optical head 1 is constructed similarly to the first embodiment. By making the second surface 6b of the transparent condensing medium 6 planar, it becomes possible to increase productivity when manufacturing the transparent condensing medium 6.

Figure 3:
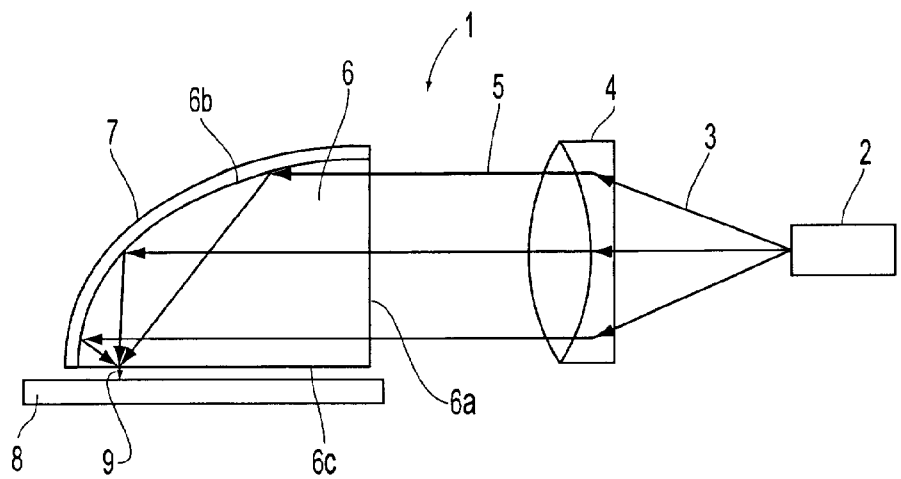
FIG. 3 is a view showing an optical head according to a third embodiment of the present invention.

FIG. 3 shows an optical head according to a third embodiment of the present invention. This optical head 1 is obtained by using a part of a spherical surface for the second surface 6b of a transparent condensing medium 6, and using a reflective hologram, such as a volume hologram or a binary hologram for the reflective layer 7. In other respects, the optical head 1 is constructed similarly to the first embodiment. A spherical surface is somewhat inferior in light condensing property, but is improved in light condensing performance by using a reflective hologram for the reflective layer 7. Incidentally, metal, such as aluminum, may be evaporated onto the second surface 6b of the transparent condensing medium 6 as the reflective layer 7.

FIGS. 1–3 show only three possible embodiments of a transparent condensing medium 6. As will be appreciated by those of ordinary skill in the art, other physical shapes and orientations for the transparent condensing medium 6 are possible. The example embodiments shown in FIGS. 1–3 show the collimated beam 5 entering the transparent condensing medium 6 in a direction parallel to the third surface 6c. However, the collimated beam 5 could enter the transparent condensing medium 6 in any direction, including perpendicular, relative to the third surface 6c. That is, the first and second surfaces 6a and 6c need not be perpendicular planar surfaces, but can be non-planar, e.g., having optical power, and/or be transverse or perpendicular to each other.

Further, the examples in FIGS. 1–3 include only one continuous reflective surface 6b. However, multiple continuous or discontinuous reflective surfaces can be used to condense a light ray and form a spot for optical reproduction and/or recording. For example, a first reflective surface could reflect a light beam to a second reflective surface that condenses the light beam to form a spot. The reflective surface(s) also need not be formed at an exterior surface of the transparent condensing medium 6. Instead, the reflective surface(s)/structure(s) could be formed at an interior portion of a condensing medium. The above examples also all use a reflective material to reflect light. However, the reflective surface(s) could be made reflective by other means, such as a relatively high index of refraction gradient like that used in optical prisms to reflect light. Thus, a reflective structure used in the invention could be an interface between two substances having a different index of refraction.

In addition, the examples shown in FIGS. 1–3 are constructed to condense an incident collimated beam 5. In the above examples, a collimated beam 5 is used to make the system less sensitive to thermal fluctuations. However, other constructions are possible that do not use a collimated beam 5. For example, the transparent condensing medium 6 could receive uncollimated light directly or indirectly from a light source and condense the light, using one or more reflective surfaces, to form a spot.

Figure 4A:
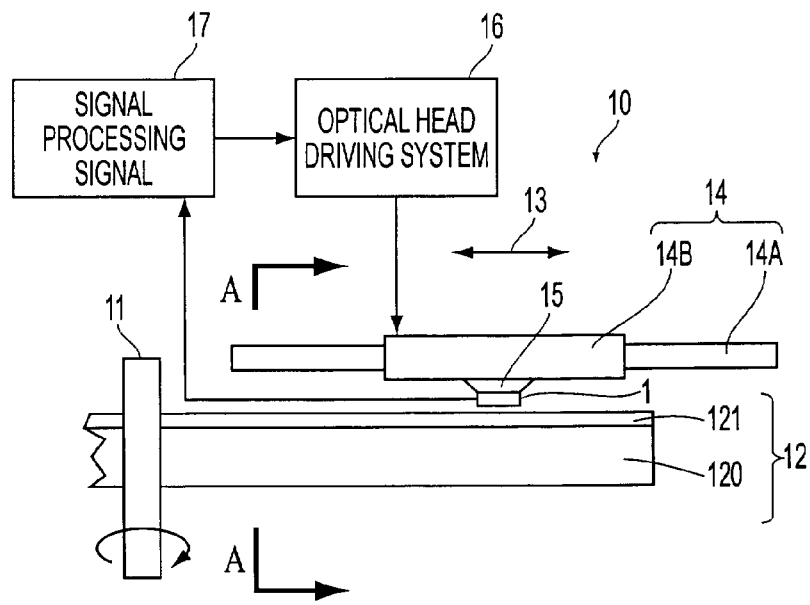
FIG. 4(A) is a view showing an optical disk apparatus according to .first embodiment of the present invention.
Figure 4B:
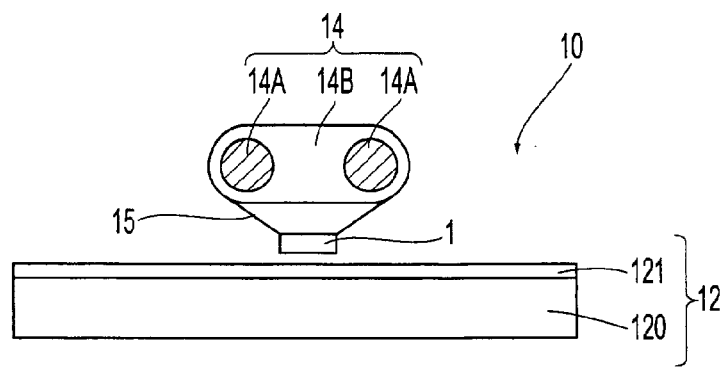
FIG. 4(B) is a cross-sectional view taken on line A—A of FIG. 4(A)

FIG. 4(A) shows an optical disk apparatus according to a first embodiment of the present invention, and FIG. 4(B) is a cross-sectional view taken on line A—A of FIG. 4(A). This optical disk apparatus 10 comprises an optical disk 12, in which a recording layer 121 is preferably made of GeSbTe phase-change material on one surface of a disk-shaped plastic plate 120, and which is rotated by a motor (not shown) through a rotational shaft 11. An optical head 1 performs optical recording/optical reproduction using the recording layer 121 of the optical disk 12. A linear motor 14 moves the optical head 1 in tracking directions 13, and a suspension 15 supports the optical head 1 from the linear motor 14 side. An optical head driving system 16 drives the optical head 1, and a signal processing system 17 processes a signal obtained from the optical head 1 and controls the optical head driving system 16.

The linear motor 14 comprises a pair of fixed portions 14A provided along the tracking directions 13 and a movable coil 14B for moving on the pair of fixed portions 14A. The optical head 1 is supported by the suspension 15 from the movable coil 14B.

Figure 5:
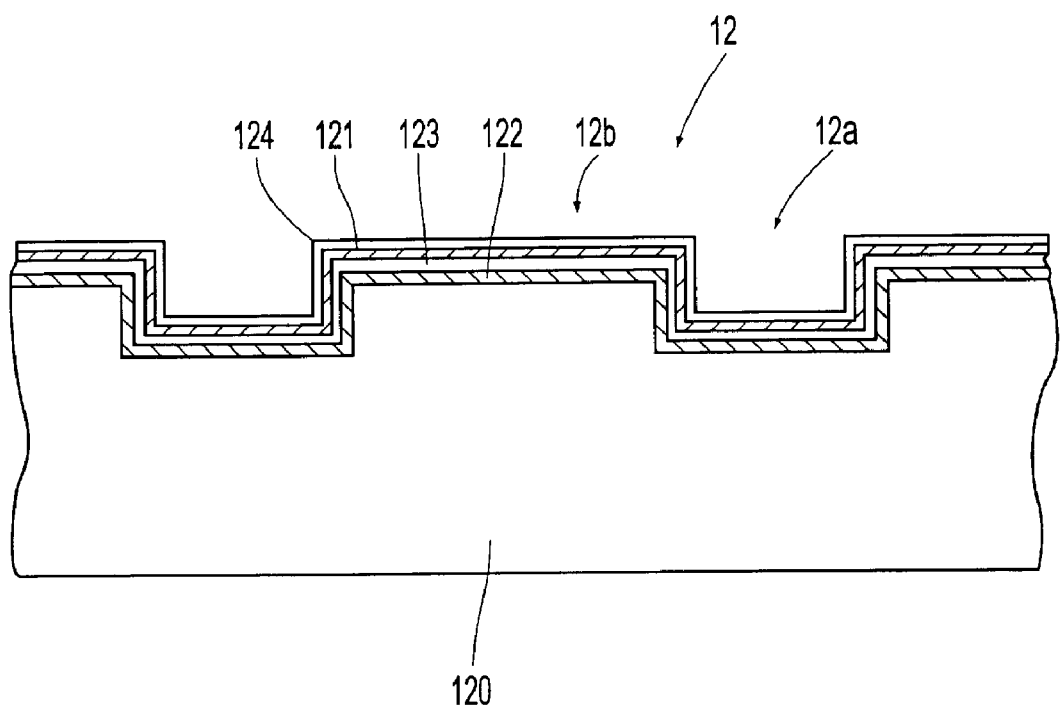
FIG. 5 is a cross-sectional view showing an optical disk used in the optical disk apparatus shown in FIGS. 4(A) and 4(B)

FIG. 5 shows the detail of a preferred optical disk 12 for use with the invention. In this optical disk 12, high-density recording is used to take advantage of a minute beam spot 9 formed by the optical head 1. A plastic plate 120 is formed, for example, from a polycarbonate substrate or the like, and a grooved portion 12a is formed on one surface thereof. The optical disk 12 is preferably formed by stacking an Al reflective film layer (approximately 100 nm thick) 122, a SiO$_2$ layer (approximately 100 nm thick) 123, a GeSbTe recording layer (approximately 15 nm thick) 121, and a SiN layer (approximately 50 nm thick) 124 on the surface on the side, on which the grooved portion 12a in the plastic plate 120 is formed. In this embodiment, information is recorded in a land portion 12b, the track pitch is 0.25 μm, and the depth of the grooved portion 12a is about 0.1 μm. The mark length is 0.13 μm, the recording density is 19 Gbits/inch$^2$, and a 12 cm disk corresponds to a recording capacity of 27 GB, the recording density of which is 7.6 times higher than that of a conventional disk.

Figure 6A:
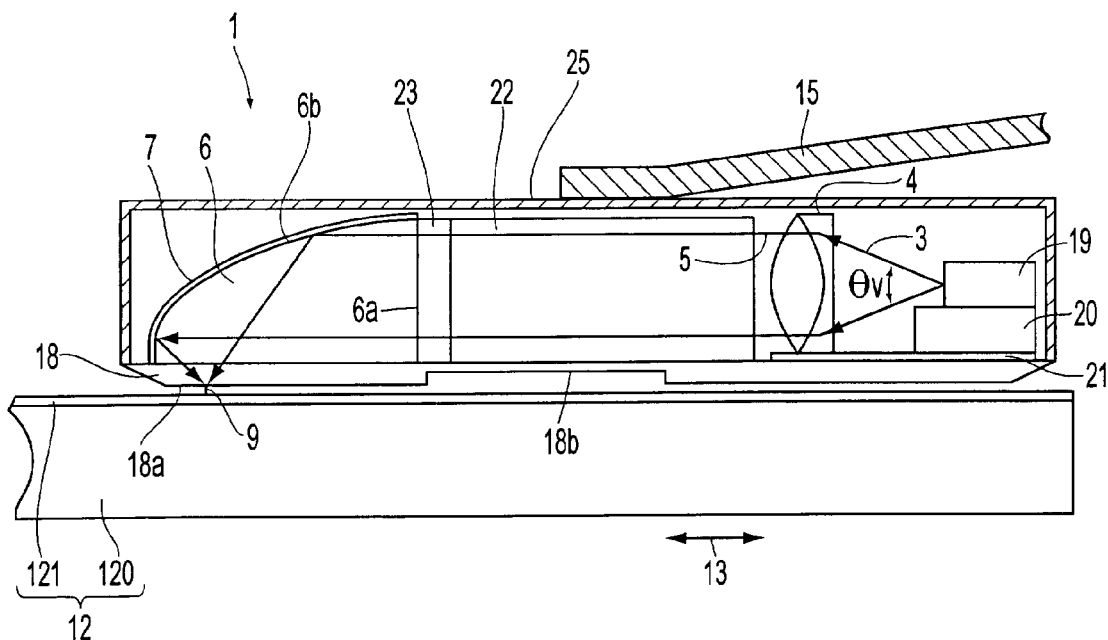
FIG. 6(A) is a side view showing the optical head used in the optical disk apparatus shown in FIGS. 4(A) and 4(B)
Figure 6B:
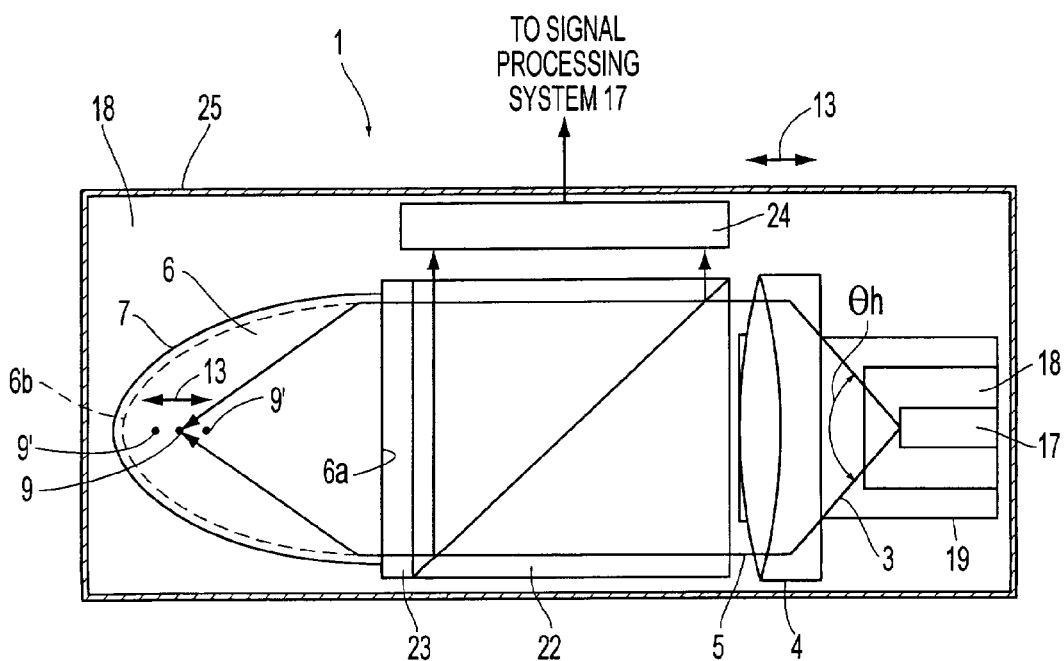
FIG. 6(B) is a plan view showing the optical head.

FIGS. 6(A) and 6(B) show an optical head 1, FIG. 6(A) is its side view, and FIG. 6(B) is its plan view. The optical head 1 has a flying slider 18 for flying on an optical disk 12. Mounted on the lying slider 18 are an end emission type semiconductor laser 19 for emitting a laser beam 3, and a piezoelectric element 20 for displacing a beam spot 9 in tracking directions 13 as shown by reference numeral 9' in FIGS. 6(A) and 6(B) by moving the end emission type semiconductor laser 19 up-and-down. A collimator lens 4 collimates a laser beam 3 emitted from the semiconductor laser 19 into a collimated beam 5. A fused quartz plate 21 fixes the piezoelectric element 20 and the collimator lens 4 on the flying slider 18. A polarizing beam splitter 22 splits the collimated beam 5 from the semiconductor laser 19 and light reflected by the optical disk 12. A ¼ wavelength plate 23 converts the linearly polarized light of the collimated beam 5 into circularly polarized light, and a transparent condensing medium 6 condenses the collimated beam 5 from the semiconductor laser 19 using a reflective layer 7 formed on the outside of the second surface 6b of the transparent condensing medium 6. A photodetector 24 inputs light reflected by the optical disk 12 and received from the beam splitter 22. These components are all accommodated within a head case 25 that is fixed to the tip end of a suspension 15.

The transparent condensing medium 6 is made of, for example, dense flint glass having a refractive index of n=1.91, and has a height of 1 mm, and a length of 2 mm. The transparent condensing medium 6 has a first surface 6a and a second surface 6b similar to that shown in FIGS. 1 to 3. The flying slider 18 is made of or includes a transparent medium having the same refractive index as the transparent condensing medium 6, and is constructed such that the lower surface 16a of the flying slider 18 corresponds to the third surface 6b. A beam spot 9 is formed on the lower surface 16a of the flying slider 18.

Figure 7:
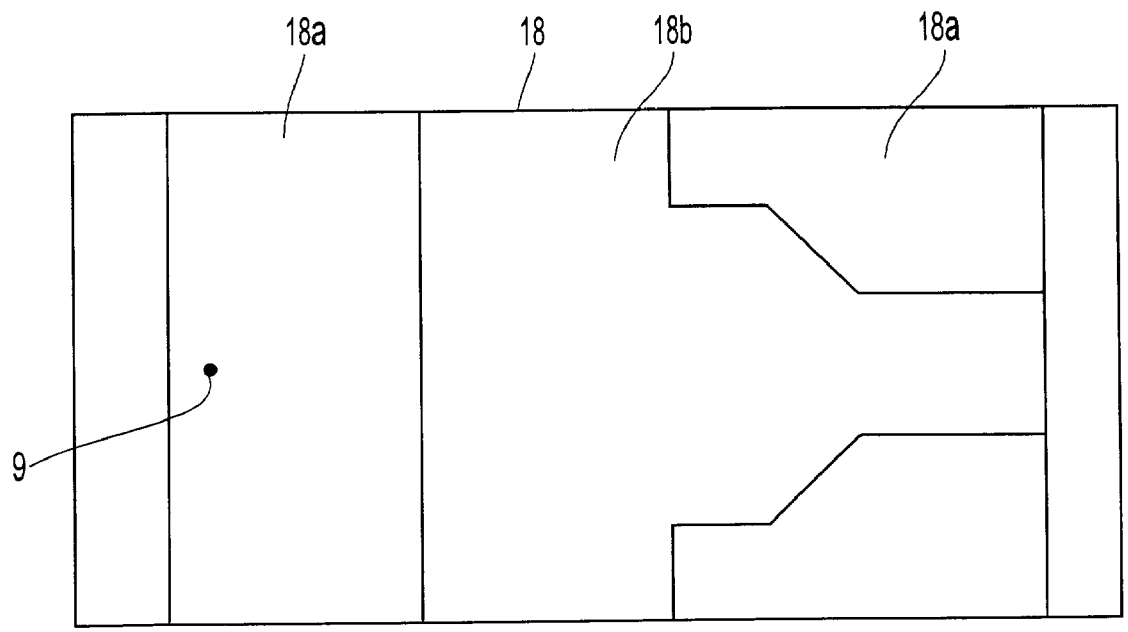
FIG. 7 is a rear view showing a flying slider used in the optical disk apparatus shown in FIGS. 4(A) and 4(B)

FIG. 7 shows the rear surface of the flying slider 18. The flying slider 18 is formed with a groove 18b so a negative pressure is developed in portions other than the peripheral portion where the beam spot 9 is formed on the lower surface 18a. The operation of the negative pressure due to the groove 18b and the spring force of the suspension 15 causes the spacing between the beam spot 9 and the optical disk 12 to be maintained constant. In this embodiment, the spacing, or amount of levitation, is about 0.1 μm. In this respect, the lower surface 18a becomes the sliding surface.

Figure 8:
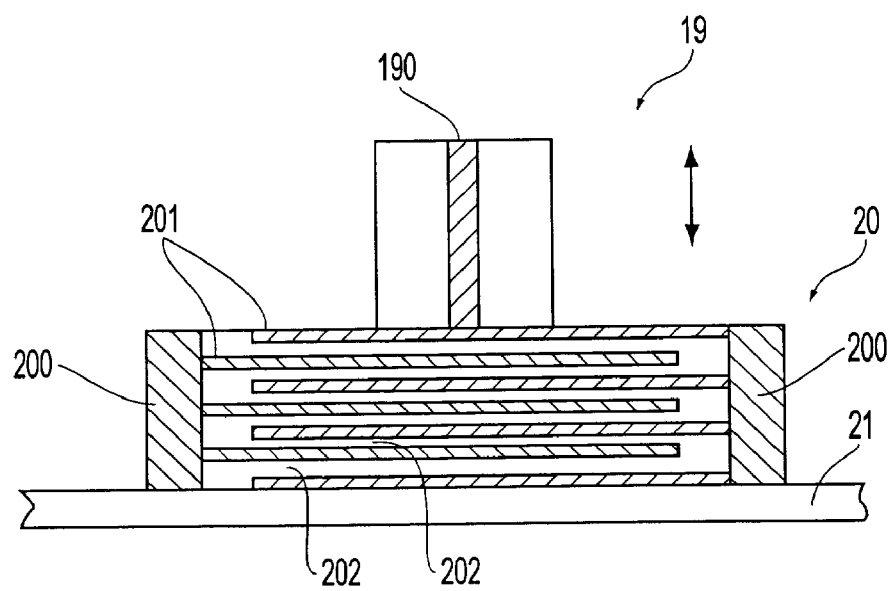
FIG. 8 is a view showing a semiconductor laser scanning unit used in the optical disk apparatus shown in FIGS. 4(A) and 4(B)

FIG. 8 shows an end emission type semiconductor laser 19 and a piezoelectric element 20. The end emission type semiconductor laser 19 is made of, for example, AlGaInP, and emits a laser beam having a wavelength of 630 nm. An active layer 190 of the semiconductor laser 19 is arranged in a direction perpendicular to the surface of the optical disk 12. In the end emission type semiconductor laser 19, a beam divergence angle θh (see FIG. 6(B)) in a plane parallel to the plane of the active layer 190 is 8 to 10 degrees, which is as small as half or less a beam divergence angle θv (see FIG. 6(A)) of 25 to 30 degrees in a plane perpendicular to the plane of the active layer 190. On the other hand, an aperture in the transparent condensing medium 6 having an outer surface defining a paraboloid has a size in the vertical direction of half that in the lateral direction, and the semiconductor laser 19 is arranged as described above. Thus, it is possible to have the laser beam transmitted to the transparent condensing medium 6 with almost no optical loss. The use of the end emission type semiconductor laser 19 provides a small-sized (for example, 0.3×0.4×0.4 mm), light-weight (for example, 0.5 mg or less) laser light source, enabling the optical head 1 to be small-sized and light-weight.

The piezoelectric element consists of a plurality of electrode films 201 connected to electrode terminals 200 and multi-layer PZT films (about 20 μm thick) 202 formed between the electrode films 201. This piezoelectric element 20 is applied to the fused quartz plate 21, and the semiconductor laser 19 is fixed on the piezoelectric element 20. Since the weight of the semiconductor laser 19 is as little as 0.5 mg or less, the resonant frequency of a system for supporting the semiconductor laser 19 could be set to 300 kHz or higher, and a displacement of 0.5 μm or more can be obtained at applied voltage of 5 V between the electrode terminals 200. The up-and-down scanning of the semiconductor laser 19 by this piezoelectric element 20 enables the beam spot 9 on the third surface 6c to be scanned in the tracking directions 13.

An optical head driving system 16 modulates, during recording, optical-power output from the semiconductor laser 19 through a recording signal, whereby a phase change between crystal and amorphous is preferably caused on a recording layer 121 to record information. During reproduction, the system does not modulate the optical-power output from the semiconductor laser 19, but emits light continuously, and the difference in reflectivity on the recording layer 121 is detected by a photodetector 24 as fluctuations in reflected light.

A signal processing system 17 generates an error signal for tracking control and a data signal on the basis of light reflected by the optical disk 12 that is detected by the photodetector 24. The signal processing system 17 forms an error signal in a high frequency area and an error signal in a low frequency area from the error signal by a high-pass filter and a low-pass filter and provides tracking control the optical head driving system 16 on the basis of these error signals. Here, the error signal for tracking is adapted to be generated in accordance with a sampled servo system (Optical Disk Technique, Radio Technique Co., P. 95). The sampled servo system is to intermittently detect wobbled tracks for generating an error signal from fluctuations in reflection intensity from the tracks. Also, the tracking control is performed under two-stage control in which the linear motor 14 is controlled on the basis of the error signal in the low frequency area, and the piezoelectric element 20 is controlled on the basis of the error signal in the high frequency area. In the case of the sampled servo system, since the recording signal and the tracking error signal are separated in view of time sharing, the two are separated by a gate circuit in a reproduction circuit. Incidentally, the error signal may be generated by a push-pull system in which interference to light reflected by the groove portion 12a is utilized.

Since the recording signal and the tracking error signal are separated in view of time sharing when using the sampled servo system as described above, a split type photodetector is not required for the photodetector 24. Instead, for example, a 1 mm square PIN photodiode can be used. Since the split type photodetector is not required as the photodetector 24, the detection system can be greatly simplified and reduced in weight.

The operation of the optical disk apparatus 10 will be described. The optical disk 12 is rotated at a predetermined speed by a motor (not shown), and the flying slider 18 is caused to levitate and travel on the optical disk 12 by the operation of the negative pressure generated by the rotation of the optical disk 12 and the spring force of the suspension 15. When a laser beam 3 is emitted from the end emission type semiconductor laser 19 driven by the optical head driving system 16, the optical-power output 3 from the semiconductor laser 19 is shaped into a collimated beam 5 by a collimator lens 4, thereafter passes through a polarizing beam splitter 22 and a ¼ wavelength plate 23, and is incident on the first surface 6a of the transparent condensing medium 6. The collimated beam 5 is converted from linearly polarized light into circularly polarized light by the ¼ wavelength plate 23 on passing through the ¼ wavelength plate 23. The circularly polarized collimated beam 5 incident on the first surface 6a of the transparent condensing medium 6 is reflected by a reflective layer 7 on the second surface 6b and condensed on the lower surface 18a of the flying slider 18. A minute beam spot 9 is formed on the lower surface 18a of the flying slider 18. From the beam spot 9, near field light is emitted on the outside of the lower surface 18a of the flying slider 18, and this near field light propagates to the recording layer 121 of the optical disk 12 to perform optical recording or optical reproduction. The light reflected by the optical disk 12 follows the path of the incident light in reverse, is reflected by the reflective layer 7, is reflected at a 90° angle by a polarizing beam splitter 22, and is incident on the photodetector 24. A signal processing system 17 generates an error signal for tracking control and a data signal on the basis of the light reflected by the optical disk 12 that is incident on the photodetector 24, and tracking controls the optical driving system 16 on the basis of the error signal.

The optical disk apparatus 10 constructed as described above has the following effects:

(a) The maximum angle of reflection in the second surface 6b of the transparent condensing medium 6 is 60 degrees, NA of 0.86 is obtained, and as a result, a minute beam spot 9 having a spot size $D_{1/2}$ of about 0.2 μm is obtained. Thus, it is possible to perform ultra-high density (19 Gbits/inch$^2$) optical recording/optical reproduction.

(b) Since recording and reproduction can be performed without automatic focusing control, there is no need for the automatic focusing control mechanism, and it is possible to greatly reduce the weight of and miniaturize the optical head 1.

More specifically, the sizes and weight of the optical head 1 can be 2 mm in height, 3 mm in width, 6 mm in length and 0.2 g in weight. For this reason, the weight of the movable portion of the linear motor 14 including the movable coil 14B and the suspension 15 can be reduced to 1.0 g or less. As a result, a band of 30 kHz or higher and a gain of 60dB or more can be obtained for the linear motor 14 alone.

(c) The focal displacement due to fluctuations in temperature is small.

More specifically, although a leading cause for focal displacement is temperature fluctuation, the laser beam is a collimated beam in almost all portions of the optical system in this embodiment, and no focal displacement due to thermal expansion occurs in these portions. Portions where focal displacement is likely to occur are a portion between the semiconductor laser 19 and the collimator lens 4, and in a condensing portion due to the transparent condensing medium 6 being made of flint glass. The coefficient of linear expansion of flint glass is about $9 \times 10^{-6}$ or smaller, and the maximum change in length of the condensing portion within the operating temperature range (10 to 50° C.) of the optical disk apparatus 10 is 0.4 μm. Also, since this expansion occurs isotropically, the focal displacement due to the expansion is one order of magnitude smaller than that due to the linear expansion, and can be ignored. As regards the former collimator unit, chromatic aberration correction is applied to the collimator lens 4, and the collimator lens 4 and the semiconductor lens 19 are connected together through a fused quartz plate 21 (whose coefficient of linear expansion is $5 \times 10^{-7}$) having a low coefficient of linear expansion to restrain the fluctuations in distance therebetween. The focal displacement due to this portion is 0.02 μm or less within a range of temperature fluctuations of 40 degrees C., and this range was small enough to be ignored with respect to the depth of focus of 0.2 μm.

Figure 9:
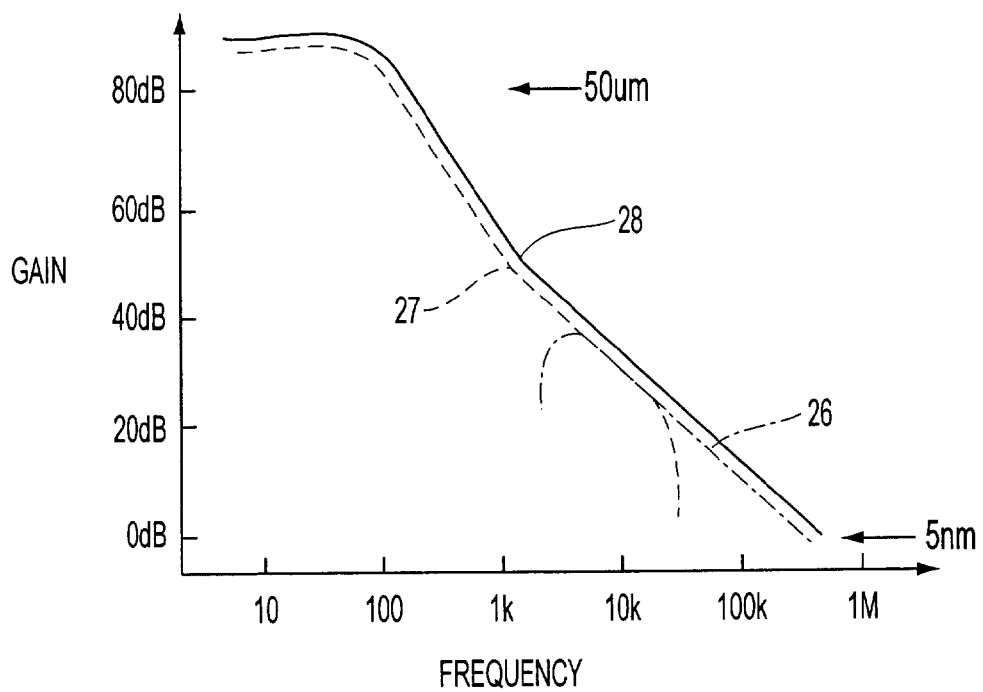
FIG. 9 is a view showing tracking control characteristics in the optical disk apparatus shown in FIGS. 4(A) and 4(B)

FIG. 9 shows the tracking control characteristics of the optical disk apparatus. By means of the two-stage control using the linear motor 14 and the piezoelectric element 20, a 200 kHz band can be obtained as designated by reference numeral 26 in FIG. 9, and tracking can be performed at a tolerance of 0.01 μm at high-speed rotation (3,600 rpm). Reference numeral 27 designates the response characteristics of the linear motor 14, and by merging the two into one for two-stage control, a gain 28 of more than 80 dB could be obtained. Also, in a 12 cm disk, an average seek rate of 10 ms or less was attained. Accordingly, the access time at 3,600 rpm rotation becomes 20 ms or less.

Figure 10:
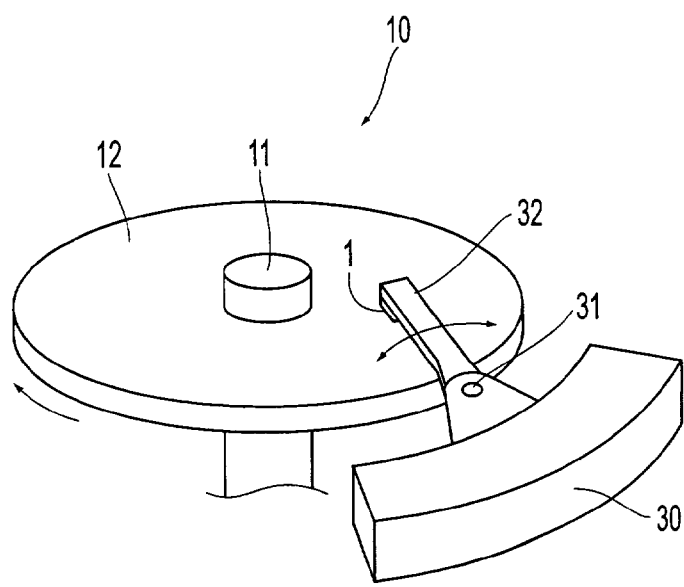
FIG. 10 is a view showing an optical disk apparatus according to a second embodiment of the present invention.

FIG. 10 shows an optical disk apparatus according to the second embodiment of the present invention. Although the linear motor 14 was used for a seek operation in the first embodiment, a rotary linear motor 30 used for hard disks is used in the second embodiment. The optical head 1 is connected to a rotary linear motor 30 through a suspension 32 rotatively supported by a rotational shaft 31. With such structure, since the rotary linear motor 30 can be arranged on the outside of the optical disk 12, the optical head 1 can be further made thinner, and the entire optical disk apparatus 10 can be miniaturized. Thereby, the disk can be rotated at high speed (3,600 rpm), and the data transfer rate can be set to 50 Mbps or more on average. Also, in this apparatus, since the tracking directions are perpendicular to the direction of optical-power output from the semiconductor laser, the semiconductor laser or its output beam must be scanned in the direction perpendicular to the direction of optical-power output from the semiconductor laser for tracking.

Figure 11:
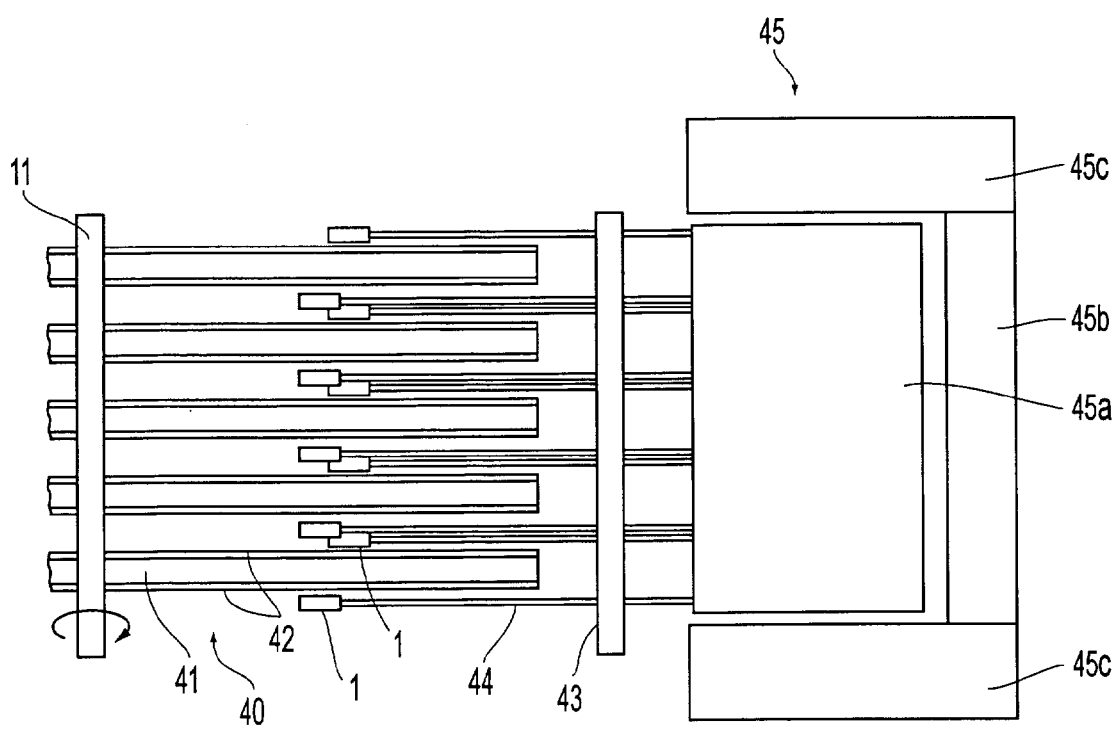
FIG. 11 is a view showing an optical disk apparatus according to a third embodiment of the present invention.

FIG. 11 shows an optical disk apparatus according to a third embodiment of the present invention. This optical disk apparatus is obtained by applying optical heads 1 using the transparent condensing medium 6 of the first embodiment to a five-disk optical disk apparatus. The upper and lower surfaces of a plastic substrate 41 of the optical disks are coated with recording media 42. Ten optical heads 1, each for levitate-traveling on the recording medium 42 for each optical disk 40 are supported by suspensions 44 around a rotational shaft 43. A rotary linear motor 45 drives the suspensions 44. For the recording media 42, either a phase-change type media or magneto-optic type media may be used. The rotary linear motor 45 consists of a movable piece 45a to which the suspensions 44 are directly coupled, and electromagnets 45c coupled through a yoke 45b, for driving the movable piece 45a. The structure of the optical head 1 is basically the same as in the first embodiment: a transparent condensing medium 6 having a paraboloid and an AlGaInN series of laser (410 nrm) are used. The spot size is 0.2 μm, the disk diameter is 12 cm, the track pitch and mark length are 0.16 μm and 0.19 μm respectively, the single-sided capacity is 60 GB, and 1.2 TB as a whole.

Figures 12A, 12B:
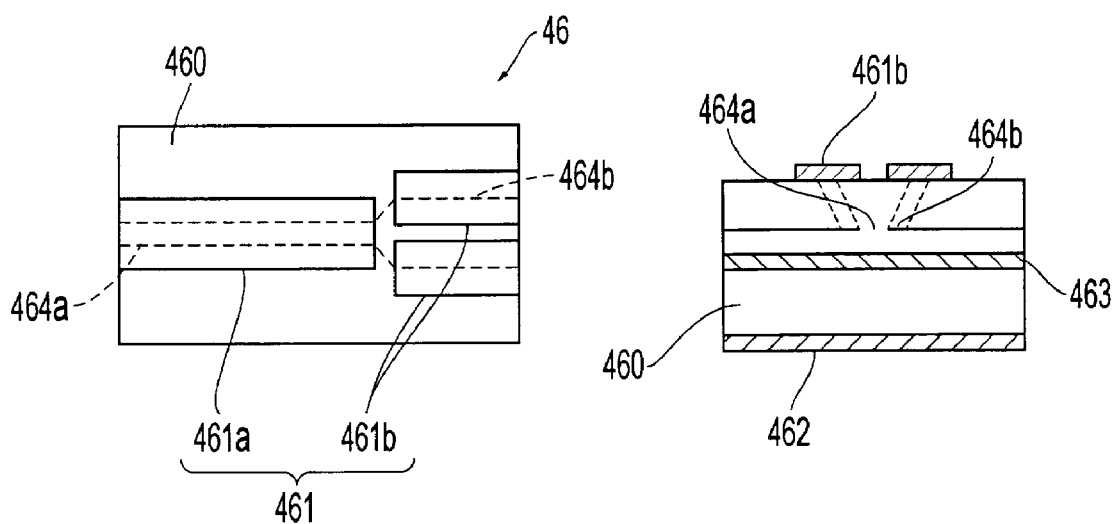
FIG. 12(A) is a plan view showing the semiconductor laser used in the optical disk apparatus shown in FIG. 11.
FIG. 12(B) is a cross-sectional view of the semiconductor laser used in the optical disk apparatus shown in FIG. 11.
Figure 13:
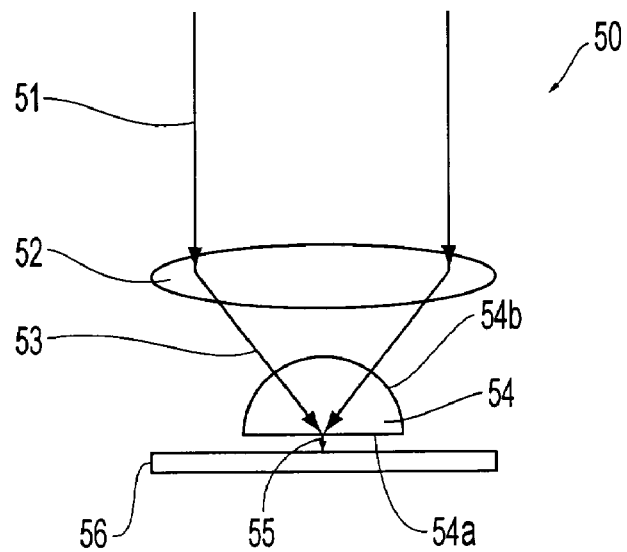
FIG. 13 is a view showing a conventional first type optical head.
Figure 14:
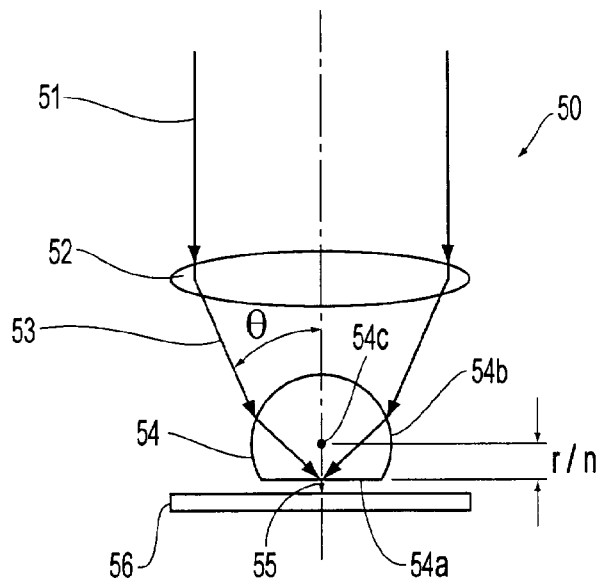
FIG. 14 is a view showing a conventional second type optical head.
Figure 15:
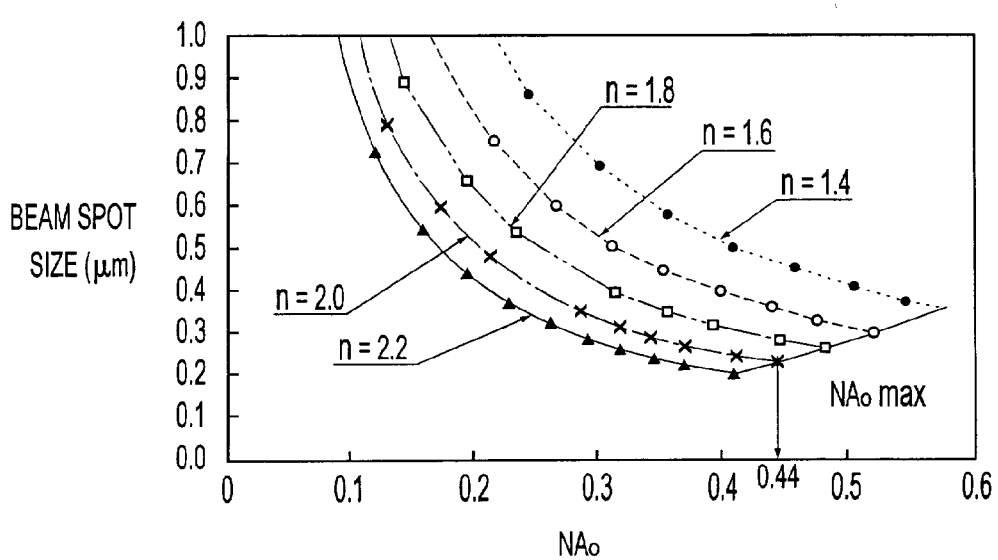
FIG. 15 is a view showing relationship between the conventional refractive index n and NA.
Figure 16:
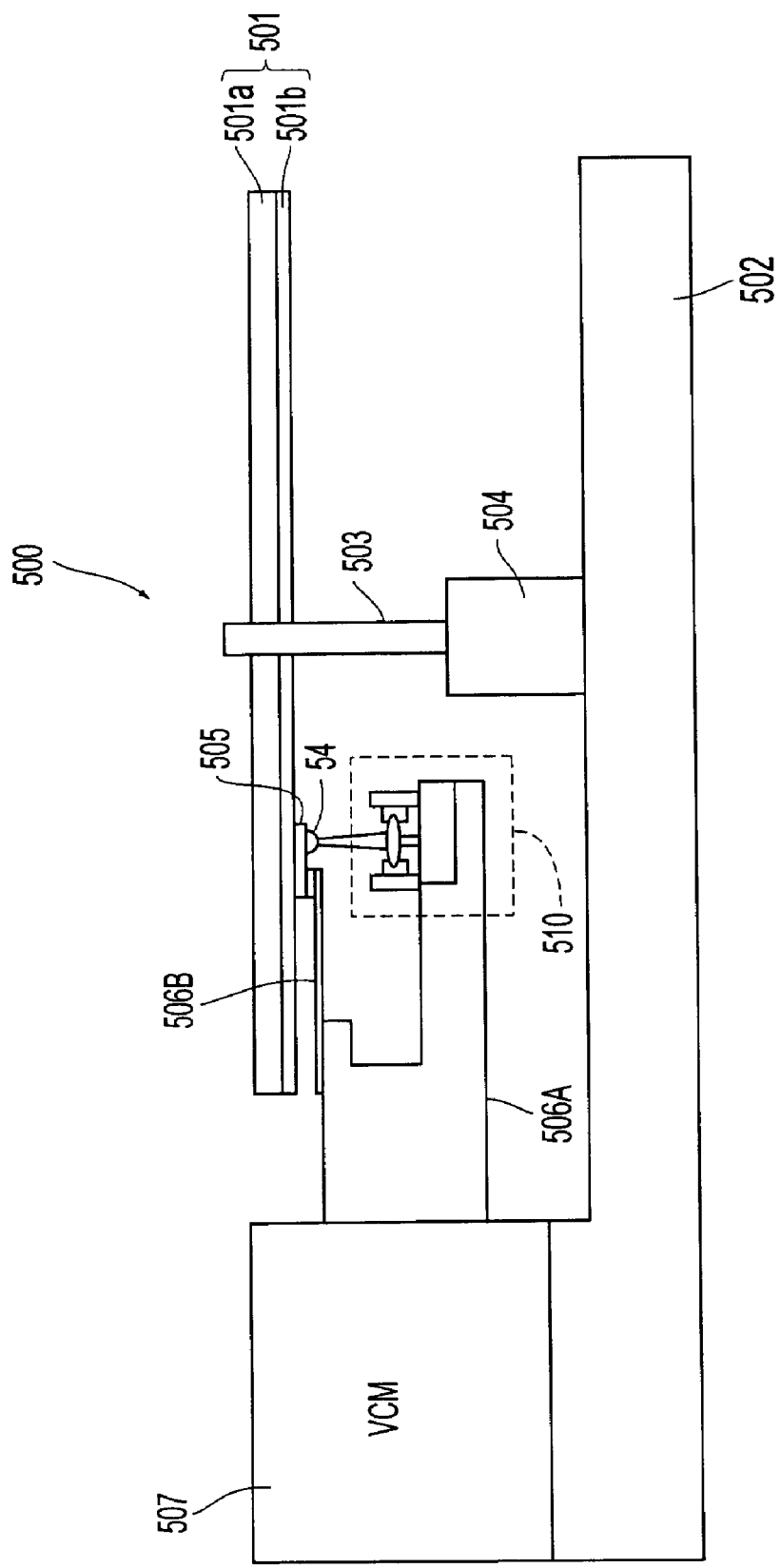
FIG. 16 is a view showing a conventional optical disk apparatus.
Figure 17:
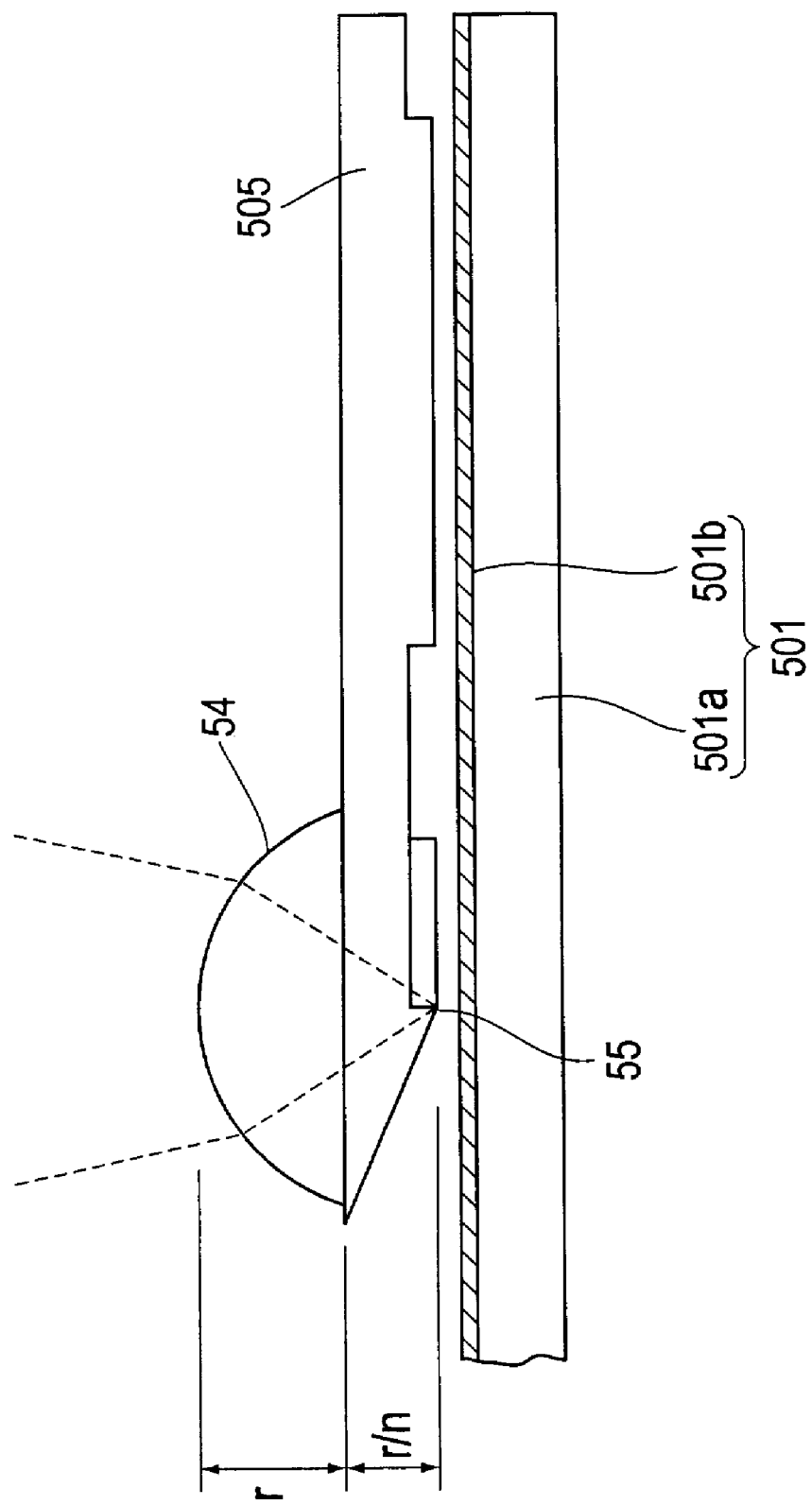
FIG. 17 is a view showing an SIL and a flying slider in the optical disk apparatus shown in FIG. 16.
Figure 18:
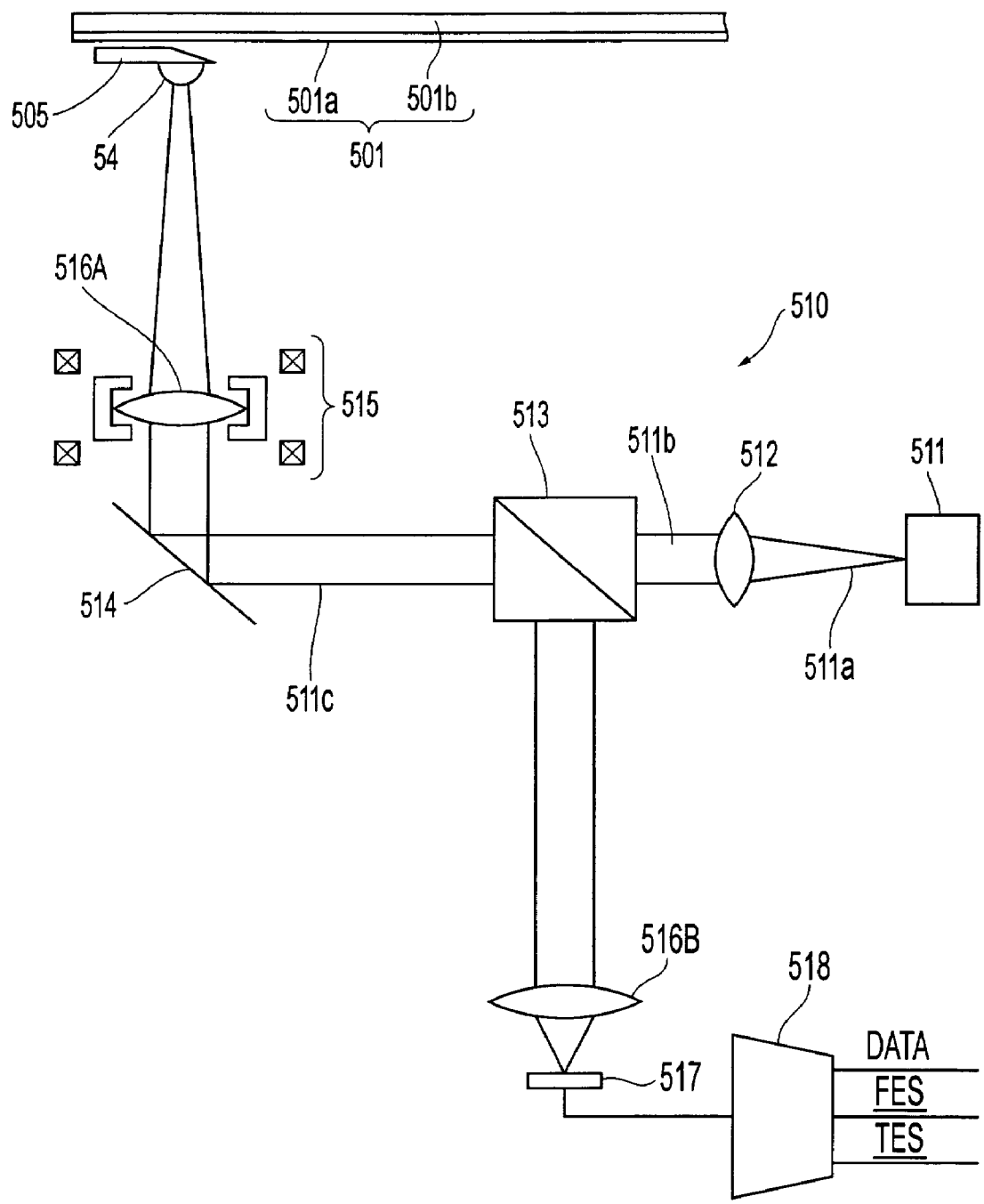
FIG. 18 is a view showing a detection optical system unit in the optical disk apparatus shown in FIG. 16.
Figure 19:
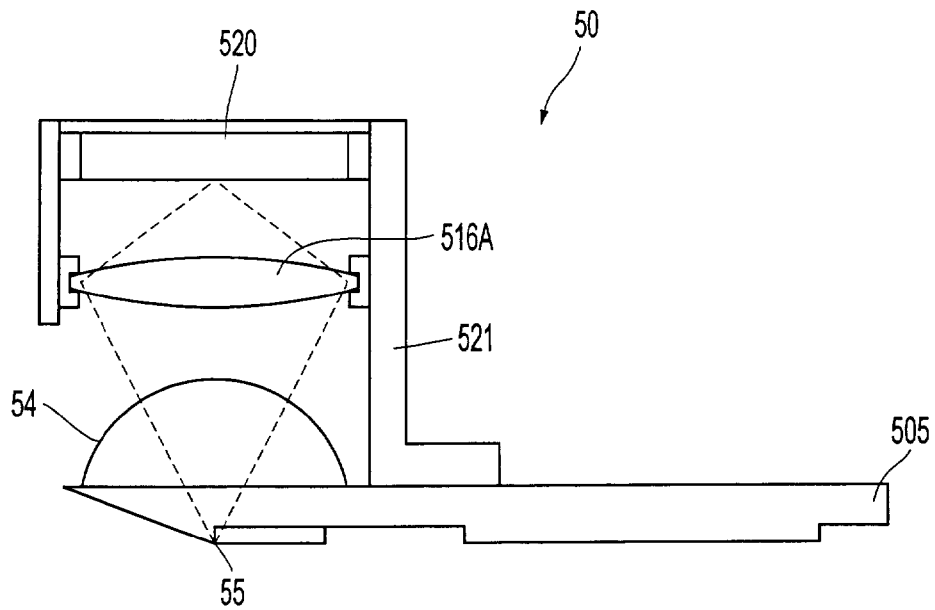
FIG. 19 is a view showing a conventional optical head.
Figure 20:
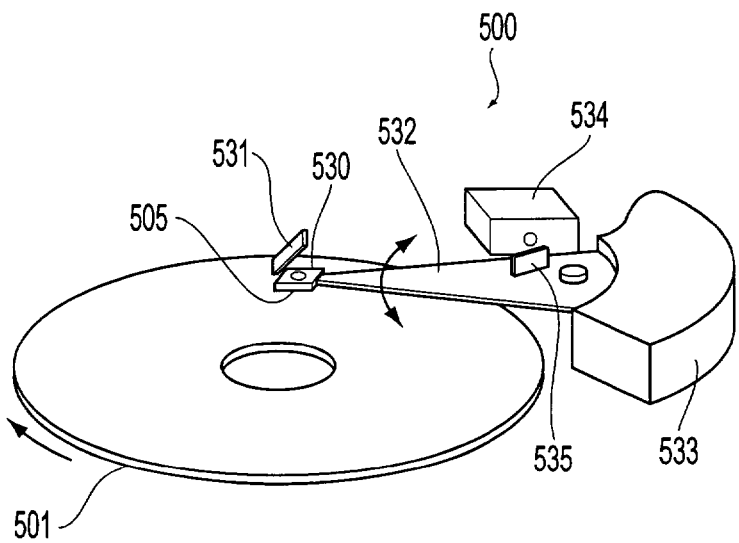
FIG. 20 is a view showing another conventional optical disk apparatus.

FIGS. 12(A) and 12(B) show a semiconductor laser according to this third embodiment. The semiconductor laser 46 is a beam scanning type semiconductor laser (Nakatsuka et al., Jpn. J. Appl. Phys. Vol.34 (1995) pp1278–pp1279), and is obtained by having a substrate 460, upper electrode 461 on the upper surface thereof, a lower electrode 462 on the lower surface, and an active layer 463 at the center respectively. A ridge-type waveguide 463 has a main portion 464a and a tip end portion 464b, which are 3 μm and 5 μm in width and 300 μm and 50 μm in length, respectively. The upper electrode 461 consists of a main electrode 461a and a pair of right and left tip end electrodes 461b. The oscillation area of the active layer 463 is narrowed by the ridge type waveguide 464a, and is also scanned laterally at the tip end portion by adding voltage to the tip end electrodes 461b alternatively, whereby the output beam is scanned laterally. The available scan width is up to 1 μm, and the available scanning frequency is up to 30 MHz. Two-stage control tracking was performed by the laser beam scanning and the linear motor 45. Also, an error signal for tracking control was generated by a wobbling method for laser beams. More specifically, by laterally scanning a laser beam 0.03 μm at high speed (10 MHz), the beam spot on the recording surface is wobbled about 0.01 μm in proportion to NA ratio of the collimator lens to the transparent condensing medium. Thereby, a reflected signal from the recording track is modulated, and an error signal is generated by detecting the modulated signal in synchronism with the scanning frequency.

With the above-described structure, it becomes possible to perform high-speed tracking without any mechanically movable components by laterally scanning a laser beam at high speed. Also, the average seek time of 10 ms or less could be attained as in the case of the first embodiment by the use of the rotary linear motor 45. Further, by use of the transparent condensing medium 6, it is possible to realize a small-sized, high-speed optical disk apparatus having an ultra-large capacity exceeding 1 TB.

In this respect, the present invention is not limited to the above-described embodiments, but it allows other variations. For example, in order to generate an error signal for tracking control, the sampled servo system has been used in the above-described embodiments, but a wobbled track system may be used in which a recording track is caused to move in a zigzag direction in the circumference, and the modulation in the reflected light caused thereby is brought into synchronization with the wobbling frequency for detection to generate an error signal.

Also, in the embodiments, the laser beam caused to become incident on the transparent condensing medium is collimated by a collimator lens, but it does not have to be collimated if the beam power is allowed to be small as, for example, during reproduction.

Also, for tracking a read-only disk, it is also possible to use a three-spot system as used with a CD. More specifically, a diffraction grating is inserted between the collimator lens and the polarizing beam splitter, and photodetector elements for detecting the ±$1^{st}$ order light reflected by the respective disks are arranged on both sides of a main beam detecting element to take the difference in the optical-power output, whereby it becomes possible to generate an error signal.

Also, it is possible to perform push-pull type control for generating an error signal by detecting an imbalance between right and left diffracted light from side surface portions of the recording track. In this case, the diffracted light is caused to become incident on a half-split type photodetector element to generate the differential output error signal. In this embodiment, however, since the semiconductor laser is scanned, the beam spot of the photodetector element also moves laterally together with the scanning. The error signal resulting from this can be restrained by laterally scanning the photodetector element in synchronization with the scanning of the semiconductor laser.

Also, an optical head according to this embodiment can be used to record on and reproduce from a write once, read many optical disk without modification.

Also, a thin-film coil can be mounted at the periphery of the beam spot condensing portion on the third surface (lower surface of the flying slider) of a transparent condensing medium for magnetic modulation, whereby it also becomes possible to perform photoelectromagnetic recording using a magneto-optic medium. In the case of reproduction, however, since a signal is generated by detecting the rotation of the optical plane of polarization by polarization analysis, it is necessary to replace the polarizing beam splitter with a non-polarizing splitter, and to arrange an analyzer in front of the photodetector element.

Also, in this embodiment, the end emission type laser was used as a laser beam source, but it is also possible to use a vertical cavity surface emitting laser (VCSEL). When using a VCSEL, the maximum output in the basic mode ($TEM_{00}$) is about 2 mW, which is one tenth or less of that of the end emission type laser. In this embodiment, however, the laser beam is condensed to a size substantially smaller than the beam spot size used in a conventional optical disk apparatus, and the optical density can be raised by at least one order of magnitude. Therefore, recording can be performed even with the VCSEL. Also, wavelength fluctuations due to temperature are small, and the need for chromatic aberration correction can be eliminated.

For the semiconductor laser, a semiconductor laser having the shortest wavelength (630 nm) on the market was used in this embodiment, and a blue laser (410 nm) of AlGaInN series currently under development can also be used in quite the same manner. In this case, the beam spot size can be reduced to 0.15 μm or less, and it becomes possible to further achieve twice or more times higher density recording.

Also, for the transparent condensing medium, dense flint glass having a refractive index of 1.91 was used in this embodiment. However, the refractive index of the condensing medium has no upper limit so long as it exceeds 1, and material having higher refractive index can be used. Crystalline material such as, for example, cadmium sulfide CdS (refractive index 2.5) and zinc blende ZnS (refractive index 2.37) may be used. Therefore, it is possible to reduce the beam spot size further by twenty percent or more, and to increase the recording density by about fifty percent.

Also, as the optical recording medium, there can be used various recording media such as recording/reproduction media using a read-only disk having uneven pits, magneto-optic recording material or phase-change material, and write once, read many media for recording by forming uneven pits by optical absorption of coloring matter, etc.

Also, in the case of using an end emission type semiconductor laser as the semiconductor laser, the arrangement may be performed such that the active layer is in parallel to the third surface (lower surface of the flying slider) of the transparent condensing medium.

As described above, according to the present invention, the laser beam incident on a first surface of the transparent condensing medium is arranged to be reflected by a reflective film formed on the outside of a second surface so as to form a beam spot on a third surface. Therefore, it is possible to utilize near field light for optical recording/reproduction that is emitted from the beam spot formed on the third surface on the outside of the third surface, and further to increase the numerical aperture within the transparent condensing medium. Therefore, the beam spot can be rendered minute, and as a result, it becomes possible to achieve, high-density recording.

In addition, since light can be condensed without using any objective lens, it is possible to miniaturize the optical head, reduce weight and to improve the data transfer rate. And it is also possible to reduce the height of the optical head as low as that of magnetic hard disk and to improve the volumetric recording density of the optical apparatus, for example.

What is claimed is:

1. An optical head, comprising:
    a light emitter that emits a light beam; and
    a transparent condensing medium that has a first surface on which said light beam is incident, and a second surface at which a reflective structure is formed that reflects light incident on said first surface to form a beam spot on a third surface of the transparent condensing medium to record or reproduce information using near field light.

2. The optical head as defined in claim 1, wherein said transparent condensing medium has a refractive index of 1 or larger.

3. The optical head as defined in claim 1, wherein said transparent condensing medium is constructed such that n·NA exceeds 0.85, where n is a refractive index of the transparent condensing medium, and NA is a numerical aperture of the transparent condensing medium.

4. The optical head as defined in claim 1, wherein said first surface of said transparent condensing medium is planar.

5. The optical head as defined in claim 1, wherein said third surface of said transparent condensing medium is planar.

6. The optical head as defined in claim 1, wherein said second surface of said transparent condensing medium defines at least a part of a paraboloid, and said reflective structure comprises a metallic film formed on said second surface.

7. The optical head as defined in claim 1, wherein said second surface of said transparent condensing medium defines at least a part of a spherical surface, and said reflective structure comprises a metallic film formed on said second surface.

8. The optical head as defined in claim 1, wherein said second surface of said transparent condensing medium defines at least a part of a paraboloid, and said reflective structure comprises a reflective hologram formed so as to define a part of a paraboloid.

9. The optical head as defined in claim 1, wherein said second surface of said transparent condensing medium defines at least a part of a spherical surface, and said reflective structure comprises a reflective hologram formed so as to define a part of a spherical surface.

10. The optical head as defined in claim 1, wherein said second surface of said transparent condensing medium is at least partially planar, and said reflective structure comprises a reflective hologram formed in at least a partially planar shape.

11. The optical head as defined in claim 8, wherein said reflective structure comprises a volume hologram.

12. The optical head as defined in claim 8, wherein said reflective structure comprises a binary hologram.

13. The optical head as defined in claim 1, wherein said transparent condensing medium comprises a first transparent medium and a second transparent medium that are fixed together and have substantially the same refractive index, said first transparent medium having said first surface and said second surface, and said second transparent medium comprises a flying slider which levitate-travels on an optical disk as the optical disk rotates, and said flying slider has said third surface.

14. The optical head as defined in claim 1, wherein said light beam emitter comprises a semiconductor laser that emits a laser beam.

15. The optical head as defined in claim 14, wherein said semiconductor laser comprises an end emission type semiconductor laser.

16. The optical head as defined in claim 15, wherein said end emission type semiconductor laser comprises an active layer that is substantially perpendicular to said third surface of said transparent condensing medium.

17. The optical head as defined in claim 15, wherein said end emission type semiconductor laser comprises an active layer that is substantially parallel to said third surface of said transparent condensing medium.

18. The optical head as defined in claim 14, wherein said semiconductor laser comprises a surface emission type semiconductor laser.

19. The optical head as defined in claim 1, wherein said light beam emitter comprises a laser beam source that emits a laser beam, and a collimator lens that shapes said laser beam from said laser beam source into a collimated beam to be incident on said first surface of said transparent condensing medium.

20. The optical head as defined in claim 1, wherein said first surface and said third surface of said transparent condensing medium are planar and are orthogonal to each other.

21. The optical head as defined in claim 1, wherein said light beam emitter comprises a laser beam source that emits a laser beam, and a piezoelectric element that moves said laser beam source to displace a position where said beam spot is formed.

22. The optical head as defined in claim 14, wherein said semiconductor laser is a beam scanning type semiconductor laser comprising a pair of electrode terminals provided near a tip end that emits said laser beam, the electrode terminals dividing an electric current or alternately applying the current to displace a position where said beam spot is formed.

23. An optical disk apparatus having an optical disk which rotates and an optical head which forms a beam spot on said optical disk by condensing a light beam, to record or reproduce information using near field light, said optical head comprising:
    a light beam emitter that emits said light beam; and
    a transparent condensing medium having a first surface on which said light beam is incident, and a second surface, at which a reflective structure is formed that reflects light incident on said first surface to form a beam spot on a third surface of the transparent condensing medium to record or reproduce information using near field light.

24. The optical disk apparatus as defined in claim 23, wherein said transparent condensing medium includes a first transparent medium and a second transparent medium which are fixed together and have substantially the same refractive index, said first transparent medium having said first surface and said second surface, said second transparent medium is a flying slider which levitates, and levitate-scans on said optical disk as the optical disk rotates, said flying slider having said third surface, and said light beam emitter and an optical system required for said optical recording or said optical reproduction are arranged on said flying slider.

25. The optical disk apparatus as defined in claim 23, wherein said optical disk is a read-only medium on which information has been recorded by means of an uneven binary digit string.

26. The optical disk apparatus as defined in claim 23, wherein said optical disk is a magneto-optic recording medium.

27. The optical disk apparatus as defined in claim 23, wherein said optical disk comprises an optical phase-change recording medium.

28. The optical disk apparatus as defined in claim 23, wherein said optical disk is a write once, read many recording medium.

29. An optical disk apparatus having a plurality of optical disks that are coaxially arranged, spaced apart at a predetermined interval and rotate, and a plurality of optical heads which condense light beams to form beam spots near said plurality of optical disks for recording or reproducing information using near field light, said optical heads each comprising:

a light beam emitter that emits a light beam; and a transparent condensing medium having a first surface on which said light beam is incident, and a second surface, at which a reflective structure is formed that reflects said light beam to form a beam spot on a third surface of the transparent condensing medium for recording or reproducing information using near field light.

30. An optical disk apparatus, having an optical disk that rotates, and an optical head having a transparent condensing medium that has a first surface on which said light beam is incident, and a second surface at which a reflective structure is formed that reflects light incident on said first surface to form a beam spot on a third surface of the transparent condensing medium to form a beam spot on said optical disk by condensing a light beam to record or reproduce information using near field light, comprising:

an optical head mover that moves said optical head in predetermined tracking directions;

a semiconductor laser that emits said light beam;

a piezoelectric element that moves said semiconductor laser to displace a position at which said beam spot is formed; and a driver that drives said optical head mover on the basis of an error signal in a low frequency area and that drives said piezoelectric element on the basis of an error signal in a high frequency area.

31. The optical disk apparatus as defined in claim 30, wherein said semiconductor laser is a beam scanning type semiconductor laser comprising a pair of electrode terminals provided near a tip end that emits said laser beam, the electrode terminals dividing an electric current or alternately applying the current to displace a position where said beam spot is formed.

32. An optical disk apparatus that forms a beam spot near an optical disk by condensing a light beam to record or reproduce information using near field light, comprising:

an irradiator that emits a collimated light beam; and a reflector that reflects said light beam to form said beam spot near said optical disk to record or reproduce information using near field light, wherein said reflector comprises a transparent condensing medium that has a first surface on which said light beam from said irradiator is incident and a second surface, at which a reflective structure is formed that reflects said laser beam incident on said first surface to form a beam spot on a third surface of the transparent condensing medium.

33. An optical head having a transparent condensing medium that has a first surface on which said light beam is incident, and a second surface at which a reflective structure is formed that reflects light incident on said first surface to form a beam spot on a third surface of the transparent condensing medium to form a beam spot near an optical disk to record or reproduce information using near field light.

* * * * *